INVENTOR
HAROLD R. NEWELL
BY Hurwitz, Rose & Greene
ATTORNEYS

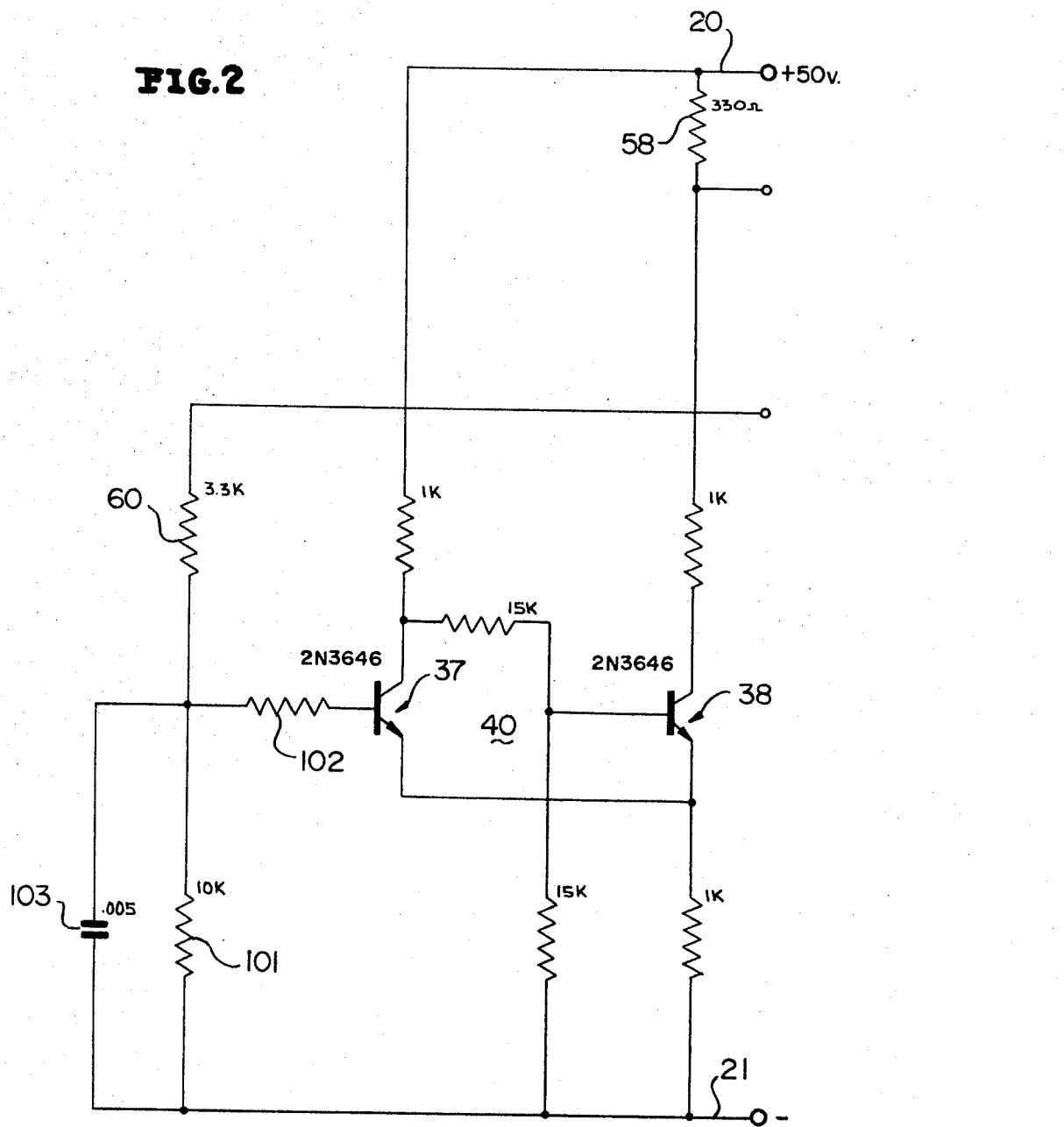

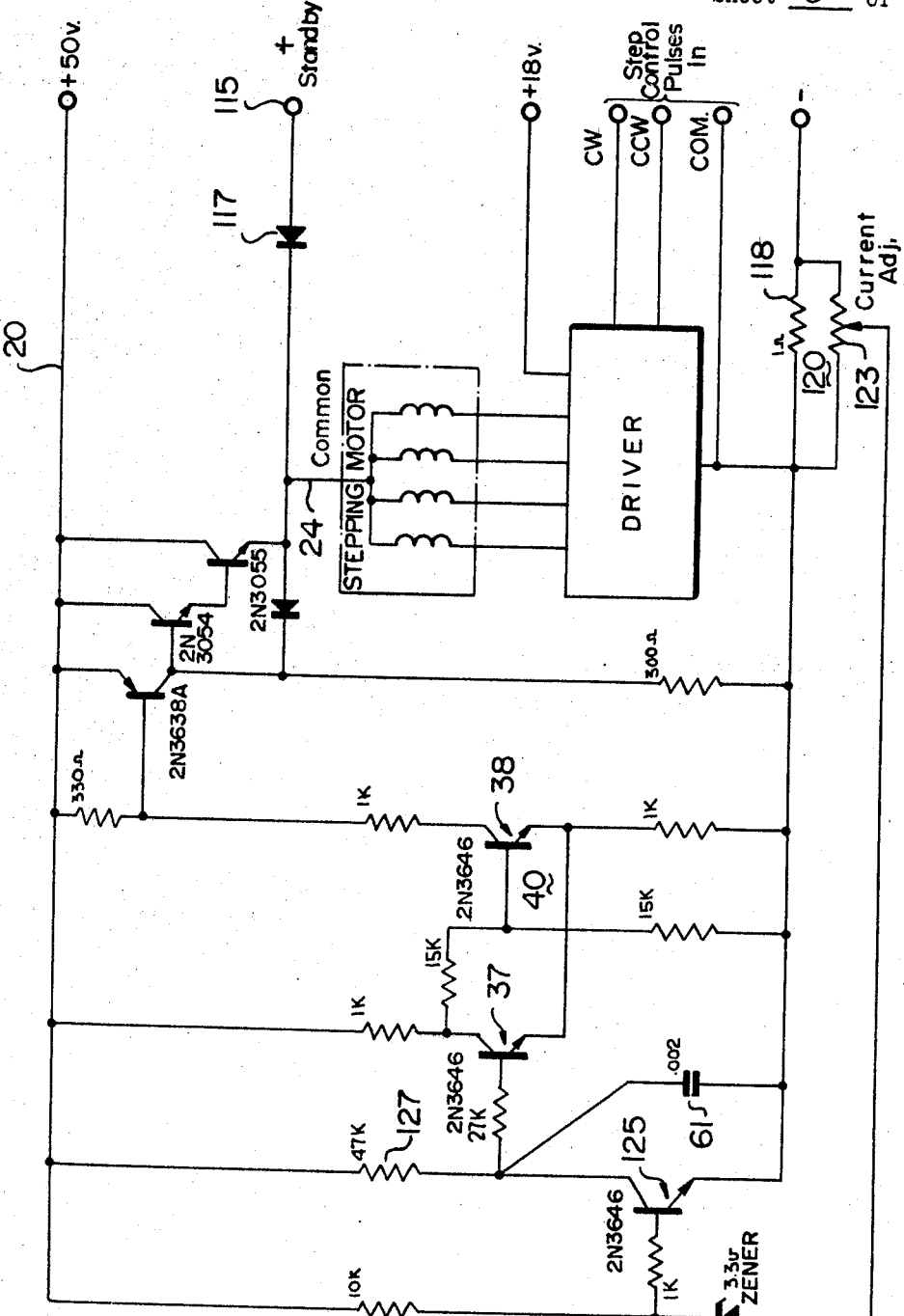

United States Patent Office 3,452,263
Patented June 24, 1969

3,452,263
STEP MOTOR DRIVE SYSTEM INCLUDING CURRENT FEEDBACK
Harold R. Newell, South Newbury, N.H., assignor to Mesur-Matic Electronics Corporation, Warner, N.H., a corporation
Filed Feb. 15, 1967, Ser. No. 616,325
Int. Cl. H02k 29/04
U.S. Cl. 318—138                                 8 Claims

ABSTRACT OF THE DISCLOSURE

Circuitry for monitoring current in the motor windings of a multi-phase step motor to detect low current levels during high speed stepping of the motor as a result of finite time required for current buildup through an inductance, and for increasing the level of voltage supplied to the windings as may be necessary to compensate and enhance the winding current level during the periods of otherwise low current levels.

---

The present invention relates generally to multiphase synchronous or stepping motors, and more particularly to means for driving such motors over a wide range of stepping rates while maintaining high torque producing capability.

In general, multiphase digital step motors are operated or driven by sequentially switching the supply voltage across the several motor windings in a predetermined order such that each winding is energized for an equal increment of time. For example, a four phase step motor having field windings A, B, C, and D corresponding to the number of phases and arranged relative to one another and to the rotor to produce, when energized, a magnetic field exerting a torque on the rotor, is normally subjected to a switching format in which driving voltage (or current) is applied to the windings in the sequence A, B, C, D, A, B, C, D, etc. for equal intervals of time such that the shaft undergoes discrete equiangular stepped rotation. Some improvement in operation, and specifically an increase in torque, may be obtained by certain variations of the sequential energization (switching format) of the windings, as by application of energizing current to two windings at a time in the equal time interval sequence, e.g., excitation of windings according to the format A+B, B+C, C+D, D+A, A+B, and so forth.

Usually, a fixed voltage is applied to the several motor windings in the preselected switching sequence, to produce the incremental rotation of the output shaft. Since the inductance of the windings will not permit instantaneous changes in current magnitude, it follows that as energizing voltage is applied across one or more of the windings a finite time is required for current build up. As the rate at which the motor phases are switched is increased, the average current through the windings accordingly decreases, accompanied by a drastic reduction in torque.

Accordingly, it is a principal object of the present invention to provide improved means for driving a multiphase synchronous or stepping motor over a wide range of stepping rates.

A more specific object of the invention resides in the provision of apparatus for monitoring or sensing and regulating the magnitude of current flowing through an energized winding or windings as required to maintain average current in the windings at a high level for high stepping speeds.

Briefly, the above and other objects are realized, in accordance with the present invention, by means for selectively varying the magnitude of voltage across the windings, means for monitoring or sampling current through the windings, means responsive to current of predetermined magnitude, as sensed by the monitoring means, for enabling the voltage varying means to vary the magnitude of voltage across the windings in a sense tending to enhance the value of the torque-producing current through the windings, short of the acceptable current dissipation limit of the windings, and means for periodically interrupting the capability of the enabling means to respond to the sensing of current by said monitoring means, at a rate much greater than the rate at which the motor is stepped.

In essence, the energizing current is supplied to the windings, in accordance with the preselected switching format provided by a driver which may be completely conventional, in the form of variable level pulses the average value of which is maintained at a high level despite increases in stepping rate. In one embodiment of the invention the pulses are set to occur at a fixed rate, and average current depends on variable width (and height) of the pulses. In another embodiment of the invention, the pulse rate is variable and controls average current, while the width of each pulse is fixed. In still another embodiment of the invention, variable pulse rate and fixed pulse width are achieved with lower power dissipation than in the other embodiments.

It will be understood as the description of these embodiments progresses, that they are merely representative of exemplary practical manifestations of the basic principles of the invention, and are not intended as limitations on the scope of the invention.

Another object of the present invention is to provide, in conjunction with a conventional driver for step motors, a current sensing and controlling device for varying the supply voltage applied to the field windings of the motor over a range selected to preclude substantial loss of torque despite substantial increase in stepping rate.

Still another object of the invention lies in the provision of a switching mode current regulator for adjusting the average level of current through the selectively energized windings of a stepping motor by pulsing those windings with fixed rate-variable width pulses or variable rate-fixed width pulses.

The above and still further objects, features, and attendant advantages of the invention will become apparent from a consideration of the following detailed description of certain exemplary embodiments thereof, especially when taken in conjunction with the accompanying drawings, in which:

FIGURE 2 is a circuit diagram of a modification of the embodiment of FIGURE 1; and FIGURE 3 is a circuit diagram of still another embodiment of the invention.

Figure 1:
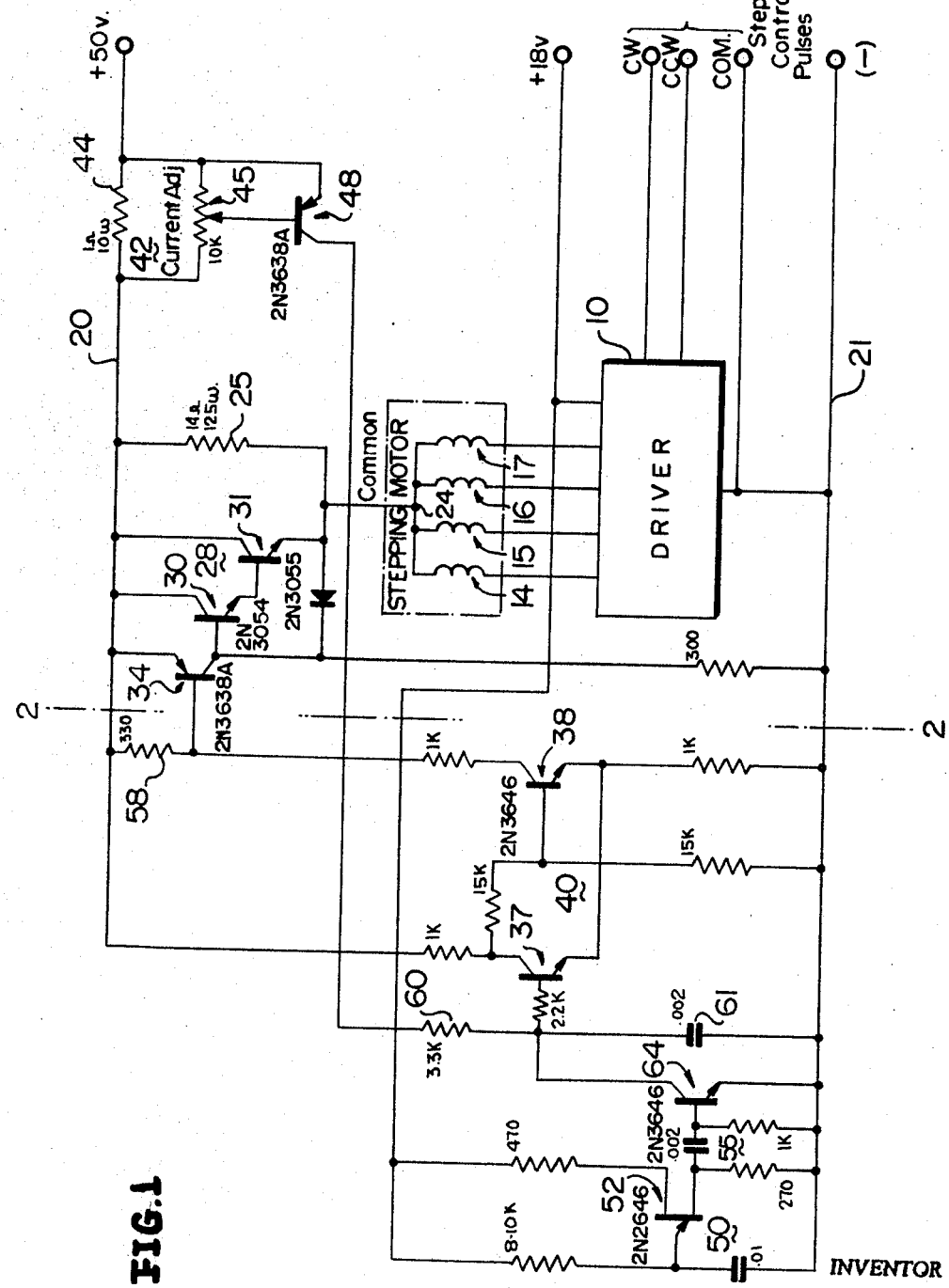
FIGURE 1 is a circuit diagram of one embodiment of the improved step motor driving apparatus of the present invention.

Referring now to the drawings, wherein like reference numerals are employed to refer to corresponding elements in the several figures, the embodiment of FIGURE 1 is used in combination with a conventional driver circuit 10 for exciting the field windings 14, 15, 16, 17, corresponding to phases A, B, C, D, of a typical four-phase step motor. The number of phases of the multiphase synchronous motor is, of course, immaterial to the essence of the invention, as will be observed as the description proceeds. Examples of motors with which the invention may be utilized are those marketed under the trade names "Responsyn" (by United Shoe Machinery Corp.) and "Slo-Syn" (by Superior Electric Co.).

In effect, driver 10 operates to convert input "step" or switching pulses from a suitable pulse generator into appropriate motor (shaft) stepping action by completing a circuit (i.e., a connection) between one end of each winding to be energized and an appropriate terminal of a power supply. Reference is made, for example, to my co-pending application for U.S. Letters Patent, Ser. No. 581,334. In FIGURE 1, as in the remaining figures, power for the overall circuit as well as for the motor is supplied via a pair of supply lines or busses designated 20 and 21, coupled to a positive voltage source and negative voltage source (or reference potential), respectively.

It will be observed throughout the drawings that each of the circuit components is assigned a parameter value and/or a standard commercial designation. This is purely for the sake of clarity and convenience to the reader, and is not in any sense intended as a limitation on component values or types, nor as a restriction on the scope of the invention.

The common connection 24 for the motor windings is coupled to the positive supply line 20 via a resistor 25 of relatively low resistance value and relatively high power dissipation capability. Thus, as a pair of windings, for example, is connected to the negative supply line or buss 21 by driver 10 in response to the input control pulses, current flows between the positive and negative terminals through the supply lines, power resistor 25, and the energized windings. Resistor 25 is utilized to reduce the voltage appearing at the postive buss by a fixed amount, so that the current through the windings is correspondingly less than would be the case in the absence of resistor 25.

Ordinarily, as rate of switching of the motor phases increases, and hence "stepping" of the shaft, the finite time required for buildup of current in the energized windings becomes an appreciable portion of the switching time for that part of the switching cycle. It follows, then, that increased stepping rate is accompanied by reduction in average current through the windings. To prevent this situation, the present invention provides current sampling and regulating circuitry for pulsing the windings with generally higher voltages, at a rate much greater than the stepping rate, and for removing the increased voltage when winding current exceeds a predetermined level.

The sampling or monitoring and regulating circuitry includes a normally closed transistorized switch 28 capable of high switching speeds and comprising a pair of NPN transistors 30 and 31 connected in Darlington configuration across resistor 25; means for controlling the switching operation of switch 28 including transistor PNP 34, and a pair of NPN transistors 37 and 38 with associated components arranged in a Schmitt trigger circuit 40; sensing or monitoring circuit 42, including extremely small valued resistor 44 in the positive supply line 20, potentiometer 45 connected in parallel with resistor 44 and having its slider adjusted to a point along the resistive portion of the pot such that when the current through the positive bus 20 (and thus through the energized winding) is excessive, the voltage at the base of transistor 48 is appropriate to render that transistor conductive; and a pulse generator 50 including unijunction transistor 52, followed by differentiation network 55.

In operation, the normal quiescent condition of Schmitt trigger circuit 40 is that in which no voltage is applied to the base of transistor 37, that transistor therefore being cut off, while transistor 38 is conductive as a result of the positive base-to-emitter bias voltage existing thereon. The consequent flow of current through the path containing resistor 58 from positive buss 20 to the base of transistor 34 results in a negative base-emitter voltage on that transistor, rendering it conductive. Hence, the base electrodes of transistors 30 and 31 of switch 28 are positive relative to their respective emitters, and the switch is therefore closed (i.e., turned "on"), so that resistor 25 is short circuited and the full value of positive supply voltage appears at the common connection 24 of the field windings.

When the current in the energized field windings reaches an excessive value, as sensed by resistor 44 in the positive buss line, the voltage at the slider tap of potentiometer 45 has the predetermined value required to turn "on" transistor 48. This, in turn, results in a positive base-to-emitter voltage for transistor 37, and the latter is rendered conductive within a time interval determined by resistor 60 and capacitor 61, while transistor 38, having its base and emitter voltages substantially equalized, is cut off. Upon this transition of Schmitt trigger 40 current flow through resistor 58 ceases and transistor 34 is rendered non-conductive, turning "off" switch 28. Accordingly, the voltage at the common connection of the field windings is reduced by restoration of the effect of the path containing resistor 25 between the power supply line and the windings.

Pulse generator 50, supplying pulses to differentiation network 55 at a rate far exceeding the switching rate of the motor phases, returns the Schmitt trigger circuit to its original state each time an impulse from the differentiator is applied to transistor 64. The latter transistor saturates for the duration of the positive impulse, thereby bringing the base of transistor 37 to the voltage at the negative bus 21, and resulting in the normal quiescent state of the trigger circuit. Again, transistor 34, and thereafter, switch 28 are turned on so that resistor 25 is shorted and common connection 24 "sees" full supply voltage.

In essence, the motor winding current is sampled during each pulse generated by generator 50, and current control is effected by the length of time switch 28 remains in an "on" (closed) condition. The repetition rate of the pulses produced by generator 50 is constant, and effectively sets the rate at which the capability of the Schmitt trigger to respond to the sensing of the predetermined current by circuit 42 is interrupted.

The inductance of the motor windings averages the current pulses applied to the windings to a relatively smooth current.

It will be noted that in the embodiment of FIGURE 1 the average current is a function of the variable width of pulses occurring at a fixed rate.

With reference now to FIGURE 2, the circuit there shown is a modification of that portion of the circuit of FIGURE 1 to the left of the alternately dotted and dashed line designated 2—2. The changes include a resistor 101 coupled from the base electrode of transistor 37 (via resistor 102) to the negative (or common) supply line, and a capacitor 103 connected in parallel with resistor 101, in place of the pulse generator 50, differentiation network 55, and commutation circuit transistor 64.

In the absence of excessive current through the motor windings, transistor 48 is cut off and the voltage at the base of transistor 37 (of Schmitt trigger 40) is simply that present on negative supply line 21. Hence, the Schmitt trigger is in its normal quiescent condition, as previously described, and transistor 34 and switch 28 are conductive. Resistor 25, therefore, is short circuited and the field windings are subjected at the common connection to the full positive voltage existing on supply line 20.

When excessive current flows through the field windings, the voltage division obtained at the slider of pot 45 renders transistor 48 conductive, thereby furnishing current, and high positive voltage, to the base of transistor 37. Accordingly, the Schmitt trigger circuit undergoes a transition in which transistor 37 assumes a conductive state and transistor 38 is cut off. Switch control transistor 34 is turned off and switch 28 opened.

Motor current is therefore reduced, as a result of the insertion of resistor 25 in the winding-supply circuit, and the voltage at the tap of potentiometer 45 falls to a value insufficient to maintain transistor 48 in the conductive state. Upon cutting off of the latter transistor, the voltage at the base of transistor 37 returns to the value of the negative line voltage and the Schmitt trigger reverts to its normal quiescent condition.

This operation is repetitive, the winding current increasing and decreasing about the desired level as the voltage at the motor common pulsates from full line voltage to a reduced value, and vice versa, at a variable rate and constant width of current pulses which are averaged (integrated) by the inductance of the motor windings. The variable pulse rate is determined principally by the RC time constants of resistor 101 and capacitor 103 and of resistor 60 and capacitor 103, and the inductive reactance of the motor circuit. These factors may be adjusted to permit rate variation over a range of rates, all of which are sufficiently greater than the phase switching or stepping rate to prevent interference with normal motor operation.

Referring now to FIGURE 3, the embodiment shown is again similar to that of FIGURE 1, except that in this case the current sensing circuit is in the negative supply line, the control circuitry for the Schmitt trigger circuit differs from those embodiments discussed earlier, and of greatest significance, the power resistor 25 in the series circuit between positive supply and motor common of the previous embodiments has been removed. Instead of the latter, a standby voltage existing at terminal 115 is used to supply a voltage level below the voltage at supply line 20 via diode 117, as required.

In operation of the embodiment of FIGURE 3, as current through resistor 118 of current sensor 120 exceeds that recommended for the windings, the predetermined magnitude of voltage thereupon existing at the slider of potentiometer 123 results in the cutting off of transistor 125 in a time interval determined chiefly by resistor 127 and capacitor 61. The positive voltage at the base of transistor 37 cuts off that transistor and the overall Schmitt circuit 40 undergoes a change of state resulting, as before, in the turning off of transistor 24 and switch 28. Hence, the voltage at common connection is no longer the positive voltage of supply line 20 and diode 117 is forward biased to conduction so that substantially the fully standby voltage, less than the level of supply line 20, is applied to the motor common.

This is followed by a reduction in winding current and of voltage across resistor 118 and potentiometer 123 of current monitoring circuit 120. Transistor 125 is rendered conductive, bringing the base of transistor 37 to the level of the negative supply line 21 and returning Schmitt trigger 40 to its quiescent state. The Darlington switch is rendered conductive and the voltage of positive supply line 20 appears at the motor common. Diode 117 is therefore reverse biased, and the sequence repeats.

As in the case of the embodiment of FIGURE 2, the circuit of FIGURE 3 supplies variable rate-fixed width current pulses to the field windings. The advantage of the embodiment of FIGURE 3 is elimination of power consumption by a series power resistor in parallel with the Darlington switch configuration, by removal of that resistor.

In each embodiment, operation is as a switching mode current regulator capable of rapid switching and preventing excessive heating of control elements by virtue of the completely "on" or completely "off" nature of the transistors.

While I have disclosed certain exemplary embodiments of my invention, it will be apparent that variations of the specific details of construction illustrated and described may be resorted to without departing from the spirit and scope of the invention as defined in the appended claims.

I claim:

1. A circuit for maintaining high torque in a multiphase digital step motor by provision of large average current to the motor windings irrespective of the stepping rate of the motor, said circuit comprising:

means for selectively varying the magnitude of voltage applied to the windings;

means for monitoring the winding current;

means responsive to current or predetermined magnitude as sensed by said monitoring means for enabling said voltage varying means to vary the magnitude of voltage applied to the windings in a sense tending to enhance torque producing current through the windings; and means for periodically interrupting the capability of the enabling means to respond to the sensing of current by said monitoring means at a rate much greater than said stepping rate of said motor.

2. The combination according to claim 1 wherein said means for periodically interrupting comprises circuit elements establishing a variable rate of interruption.

3. The combination according to claim 1 wherein said means for selectively varying voltage comprises a high speed switch, a power supply line, and means connecting said switch between said power supply line and said motor windings to open or close a path from said supply line to said windings according to the selected condition of said switch.

4. The combination according to claim 3 wherein is included power resistance means in parallel circuit with said switch, whereby current is delivered through said resistance means from said supply line to the energized motor windings when said switch is in an open condition.

5. The combination according to claim 3 wherein is included a further power supply line having a voltage less than that of the first-mentioned supply line, and diode means poled for transferring current from said further supply line to said motor windings and said switch, so that said diode means is reversed biased when said switch is in a closed condition.

6. The combination according to claim 3 wherein said means for enabling includes a trigger circuit having a pair of states, means coupling said trigger circuit to said switch to render said switch open when said trigger circuit is in one of said states, and closed when said trigger circuit is in the other of said states.

7. The combination according to claim 6 wherein said trigger circuit is operable from one of said states to the other at either a fixed or a variable rate.

8. Apparatus for exciting the windings of a multiphase stepping motor, comprising means for supply energizing current to said windings; driver means for connecting said windings to said energizing current supply means in a predetermined sequential switching format, so that each winding is energized during certain preselected portions of said switching format and de-energized during certain other preselected portions of said switching format; means for varying the magnitude of the energizing current through said windings, means for sensing the level of current through each winding, means responsive to the sensing of a predetermined level of current through the energized windings for enabling said varying means to vary the magnitude of said energizing current in a direction away from said predetermined level, and means for controlling the rate at which the response of said enabling means is manifested at a value much greater than the switching rate of said switching format.

References Cited

UNITED STATES PATENTS 3,355,646  11/1967  Goto _____ 318—138

ORIS L. RADER, *Primary Examiner.*
G. R. SIMMONS, *Assistant Examiner.*

U.S. Cl. X.R.
318—180